United States Patent
Nie et al.

(10) Patent No.: US 12,435,027 B1
(45) Date of Patent: Oct. 7, 2025

(54) PREPARATION METHOD OF N-BUTENYL AMIDE COMPOUNDS

(71) Applicant: ZHEJIANG NORMAL UNIVERSITY, Jinhua (CN)

(72) Inventors: Xingliang Nie, Jinhua (CN); Yuzhi Ma, Jinhua (CN); Jin Yan, Jinhua (CN); Dongbing Yang, Jinhua (CN); Kexin Fang, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 0 days.

(21) Appl. No.: 19/196,834

(22) Filed: May 2, 2025

(30) Foreign Application Priority Data

Nov. 27, 2024 (CN) .......................... 202411708939.3

(51) Int. Cl.
| | |
|---|---|
| *C07C 231/12* | (2006.01) |
| *C07C 269/06* | (2006.01) |
| *C07D 213/81* | (2006.01) |
| *C07D 307/68* | (2006.01) |
| *C07D 333/38* | (2006.01) |

(52) U.S. Cl.
CPC .......... *C07C 231/12* (2013.01); *C07C 269/06* (2013.01); *C07D 213/81* (2013.01); *C07D 307/68* (2013.01); *C07D 333/38* (2013.01); *C07C 2601/04* (2017.05); *C07C 2601/14* (2017.05)

(58) Field of Classification Search
CPC .................................................. C07C 231/12
See application file for complete search history.

(56) References Cited

U.S. PATENT DOCUMENTS

| | | |
|---|---|---|
| 12,060,333 B2 | 8/2024 | Liang et al. |
| 2023/0127143 A1 | 4/2023 | Matsuzaki et al. |
| 2023/0374143 A1 | 11/2023 | Kjolby et al. |
| 2024/0398757 A1 | 12/2024 | Jacobson |

FOREIGN PATENT DOCUMENTS

| | | |
|---|---|---|
| CN | 116194096 A | 5/2023 |
| CN | 116438160 A | 7/2023 |
| CN | 118103351 A | 5/2024 |
| CN | 118771953 A | 10/2024 |
| WO | 2021153782 A1 | 8/2021 |

OTHER PUBLICATIONS

Retrieval report-First search dated Dec. 27, 2024 in SIPO application No. 202411708939.3.
Notice of first Office action dated Dec. 29, 2024 in SIPO application No. 202411708939.3.
Notification to Grant Patent Right for Invention dated Feb. 25, 2025 in SIPO application No. 202411708939.3.
Retrieval report-Supplementary search dated Feb. 20, 2025 in SIPO application No. 202411708939.3.
Kui Wu, et al., Amidyl Radical Directed Remote Allylation of Unactivated sp3 C—H Bonds by Organic Photoredox Catalysis, Angew. Chem. Int. Ed., Jan. 11, 2019, pp. 1774-1778, vol. 58, doil http://dx.doi.org/10.1002/anie.201811004 Claims involved: 1-8.
Dengyou Zhang, et al., Palladium-catalyzed picolinamide-directed coupling of C(sp2)—H and C(sp2)—H: a straightforward approach to quinolinone and pyridone scaffolds, Chem. Commun. (The Royal Society of Chem.), Mar. 24, 2015, pp. 7509-7511, vol. 51, doi: 10.1039/x0xx00000x Claims involved: 1-8.
Kui Wu, et al., Visible-Light-Mediated Construction of Pyrroloindolines via an Amidyl Radical Cyclization/Carbon Radical Addition Cascade: Rapid Synthesis of (±)-Flustramide B, Organic Letters, Oct. 3, 2017, pp. 5669-5672, vol. 19, DOI: 10.1021/acs.orglett.7b02837 Claims involved: 1-8.

*Primary Examiner* — Valeerie Rodriguez-Garcia
(74) *Attorney, Agent, or Firm* — Piloff Passino & Cosenza LLP; Rachel K. Piloff; Sean A. Passino

(57) ABSTRACT

A preparation method of N-butenyl amide compounds is provided. With N-aryloxy amide and benzenesulfonyl substituted olefin as raw materials, the N-butenyl amide compound is obtained through free radical amidation reaction of olefins under the action of photocatalyst. A new synthesis method for the preparation of N-butenyl amide compounds is provided, and the obtained product has both amide structural units and alkenyl units.

4 Claims, No Drawings

PREPARATION METHOD OF N-BUTENYL AMIDE COMPOUNDS

CROSS-REFERENCE TO RELATED APPLICATIONS

This application claims priority to Chinese Patent Application No. 202411708939.3, filed on Nov. 27, 2024, the contents of which are hereby incorporated by reference.

TECHNICAL FIELD

The disclosure belongs to the technical fields of chemical synthesis, medicinal chemistry and material chemistry, in particular to a preparation method of N-butenyl amide compounds.

BACKGROUND

Amide structural units are important components of bioactive molecules, including peptides, proteins, chemical probes, various clinically approved and naturally derived drugs. In recent years, the amine alkylation of olefins is one of the effective formulas to construct amine compounds, among which photocatalytic oxidation-reduction is a hot research field with unique advantages. However, there are few reports on the construction of amide compounds through the strategy of free radical amidation of olefins, so it is still worth exploring to develop a method of free radical amidation of olefins to construct complex amides.

In recent years, amine alkylation of olefins is realized by free radical strategy. Usually, tertiary amine compounds are used as free radical precursors, and nitrogen α-carbon center free radicals are generated to add olefins to obtain amine alkylation products of olefins. However, the free radical amidation of olefins has not been fully developed due to the difficulty of producing the amide nitrogen α-carbon center free radicals. The disclosure develops a new method for generating amide nitrogen α-carbon center free radicals, which is used for efficient synthesis of N-butenyl amide compounds. These products have a wide range of amide structural units and alkenyl synthons that may be variously transformed, showing high research value.

SUMMARY

The purpose of the disclosure is to provide a preparation method of N-butenyl amide compounds, so as to solve the problems existing in the prior art. Up to now, there is no report on the reaction of synthesizing long-chain terminal alkenylamides based on the strategy of amide nitrogen α-carbon center free radicals. This method is more compatible and applicable to the synthesis of N-butenyl amide compounds, many of which are difficult to synthesize by existing methods.

A preparation method of N-butenyl amide compounds, where N-aryloxy amide and benzenesulfonyl substituted olefins are added into an alkaline organic solvent, a free radical initiator is added, and the N-butenyl amide compounds are prepared through a free radical amidation reaction of olefins under illumination.

In the present disclosure, N-aryloxy amide is used as a free radical source of amide nitrogen α-carbon center, and benzenesulfonyl substituted olefin is used as a free radical acceptor. Photosensitizer, alkali and organic solvent are added in the system in sequence to react under the illumination condition. N-butenyl amide products are finally obtained by removing benzenesulfonyl after the addition of the generated amide nitrogen α-carbon center free radicals to olefins.

Optionally, a general formula of the free radical amidation reaction of the olefins is:

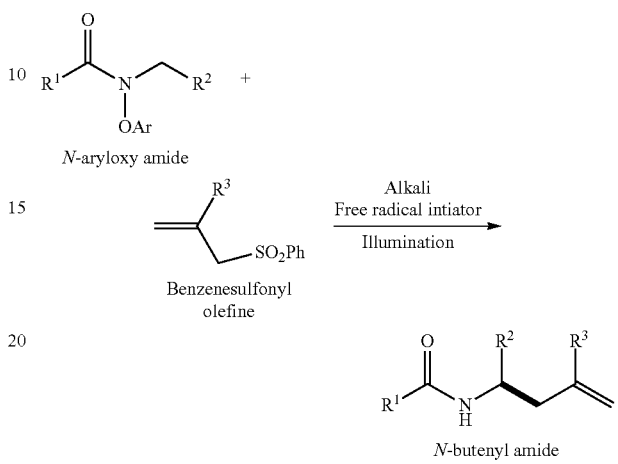

where $R^1$, $R^2$ and $R^3$ are independently selected from one of hydrogen atom, alkyl group, substituted alkyl group, alkenyl group, ester group, aryl group, substituted aryl group, heteroaromatic ring or heteroaromatic ring derivative group, and Ar is 4-nitrophenyl.

Optionally, the free radical initiator is one or more of $Pd(PPh_3)_2Cl_2$, $Ni(PPh_3)_2Cl_2$, CuCl, Cu(TC), $Cu(MeCN)_4PF_6$, $FeCl_3$, Eosin Y, 4CzIPN, TPT, Rhodamine B, fac-Ir(ppy)$_3$, Ir(ppy)$_2$bpyPF$_6$, Ir[ppy]$_2$(dtbbpy)PF$_6$, Ir[dF(CF$_3$)ppy]$_2$(dtbbpy)PF$_6$, Mes-Acr-Me-ClO$_4$, Mes-(t-Bu)$_2$Acr-Ph-BF$_4$, Mes-Acr-I, Mes-Acr-Me-PF$_6$, Mes-Acr-Ph-Cl, Mes-Acr-Ph-BF$_4$, Ru(bpz)$_3$(PF$_6$)$_2$, Ru(bpy)$_3$Cl$_2$, Ru(PPh$_3$)$_2$Cl$_2$, and Ru(PPh$_3$)$_3$Cl$_2$.

Optionally, the organic solvent is one or more of dichloroethane, acetonitrile, tetrahydrofuran, N, N-dimethylformamide (DMF), N, N-dimethylacetamide (DMAc), dimethyl sulfoxide (DMSO), 1, 4-dioxane and isopropanol.

Optionally, the alkaline organic solvent is prepared by adding one of NaHCO$_3$, Na$_2$CO$_3$, K$_2$CO$_3$, K$_3$PO$_4$, LiOH, triethylamine (Et$_3$N) and isopropyl ethylamine (DIPEA) to the organic solvent.

Optionally, a molar ratio of the N-aryloxy amide to benzenesulfonyl olefins is 1.2-3.0:1.

Optionally, the wavelength of the illumination is 360-500 nanometers (nm).

More Optionally, the wavelength of the illumination is 460 nm.

Optionally, the free radical amidation reaction is carried out at room temperature, and a reaction duration is 2-48 hours.

Compared with the prior art, the disclosure has the following advantages and technical effects.

In this disclosure, N-aryloxy amide and benzenesulfonyl substituted olefins are used as raw materials, and under the action of free radical initiator and illumination, amide nitrogen free radicals are generated to generate intramolecular 1, 2-hydrogen atom migration (HAT), and after the obtained amide α-carbon center free radicals add olefins, the leaving groups are further removed to generate free radical amidation reaction to prepare the N-butenyl amide compounds. The amide and alkenyl framework in the product structure is a part of the molecular structure of various drugs. The disclosure provides a new synthesis method for the preparation of N-butenyl amide compounds. The obtained product has both amide structural units and alkenyl units, which may be used as both amidation reagents and a class of alkenyl synthesis units, providing a new choice and path for the synthesis, modification and functionalization of various natural products, drug molecules and bioactive molecules containing amide structural units, and is expected to be widely used in the fields of organic synthesis, drug development, polymer materials and the like.

The disclosure adopts free radical reaction, which may be initiated only by simple illumination, with mild reaction conditions, high yield, low requirements for instruments and equipment and simple operation.

The method of the disclosure has good compatibility, and is suitable for amides and benzenesulfonyl olefins with various groups and multiple sites, and may be used for the synthesis of diversified N-butenyl amides.

DETAILED DESCRIPTION OF THE EMBODIMENTS

In the following, the technical scheme in the embodiments of the present disclosure will be described clearly and completely by combining the embodiments of the present disclosure with detailed descriptions of preferred embodiments and data. Obviously, the described embodiments are only part of the embodiments of the present disclosure, but not all of them. Based on the embodiments in the present disclosure, all other embodiments obtained by ordinary technicians in the field without creative labor belong to the scope of protection of the present disclosure.

It should be noted that all technical terms used in the present disclosure are only for the purpose of describing specific embodiments, and are not intended to limit the scope of protection of the present disclosure. Unless otherwise specified, various raw materials, reagents, instruments and equipment used in the following embodiments of the present disclosure may be purchased from the market or prepared by existing methods.

Embodiment 1

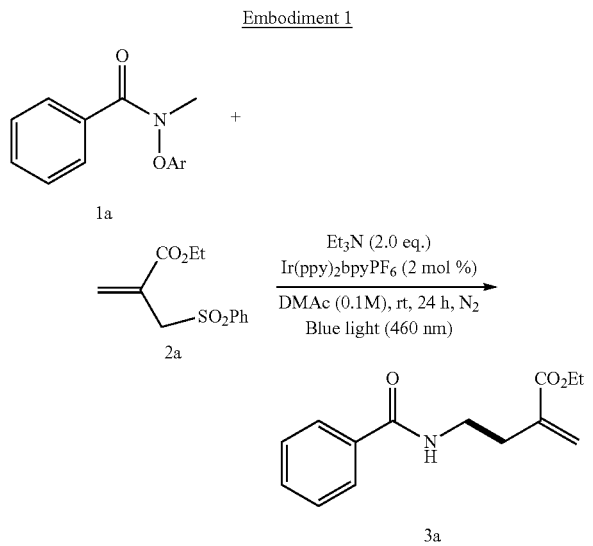

Ir(ppy)$_2$bpyPF$_6$ (0.004 millimoles (mmol), 2 moles (mol) %) and N-aryloxybenzoyl amine (1a, 0.4 mmol) are added into the dried Schlenk tube, and then 2-((phenylsulfonyl) methyl)acrylate (2a, 0.2 mmol), Et$_3$N (0.4 mmol), and acetonitrile (2.0 milliliters (mL), 0.1 Molars (M)) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mole per liter (mol/L)), once with saturated salt solution, dried with Na$_2$SO$_4$, filtered and concentrated, and further separated and purified by column chromatography (the eluent is petroleum ether:ethyl acetate=20:1 volume per volume (v/v), to obtain a colorless oily product (3a, 32 milligrams (mg), yield: 65%).

The data of hydrogen spectrum, carbon spectrum and high resolution mass spectrum of the product 3a prepared in Embodiment 1 are as follows.

$^1$H NMR (600 Megahertz (MHz), Chloroform-d) δ 7.78-7.76 (multiplet (m), 2 Hydrogen (H)), 7.50-7.48 (m, 1H), 7.44-7.42 (m, 2H), 6.68 (broad singlet (br s), 1H), 6.27 (singlet (s), 1H), 5.70 (s, 1H), 4.24 (quartet, coupling constant (q, J)=7.1 Hertz (Hz), 2H), 3.62 (q, J=6.3 Hz, 2H), 2.65 (triplet, coupling constant (t, J)=6.5 Hz, 2H), 1.31 (t, J=7.1 Hz, 3H);

$^{13}$C NMR (151 MHz, Chloroform-d) δ 167.5, 167.4, 138.1, 134.5, 131.4, 128.5, 127.3, 126.8, 61.1, 39.7, 31.8, 14.1; and HRMS (ESI) calcd for C$_{14}$H$_{18}$NO$_3^+$ (M+H)$^+$ 248.1281, found 248.1281.

Embodiment 2

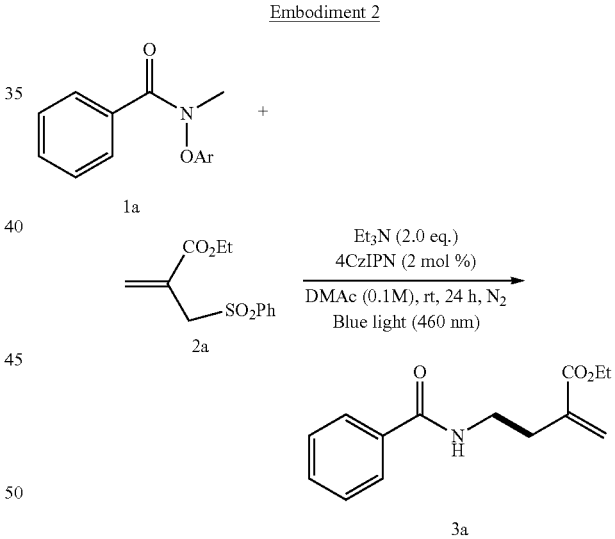

4CzIPN (0.004 mmol, 2 mol %) and N-aryloxybenzoyl amine (1a, 0.4 mmol) are added into the dried Schlenk tube, and then 2-((phenylsulfonyl) methyl)acrylate (2a, 0.2 mmol), Et$_3$N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na$_2$SO$_4$, filtered and concentrated, and further separated and purified by column chromatography (the eluent is petroleum ether:ethyl acetate=20:1 volume per volume (v/v)), to obtain a colorless oily product (3a, 38 mg, yield: 76%).

The data of hydrogen spectrum, carbon spectrum and high resolution mass spectrum of the product 3a prepared in Embodiment 2 are as follows.

¹H NMR (600 MHz, Chloroform-d) δ 7.78-7.76 (m, 2H), 7.50-7.48 (m, 1H), 7.44-7.42 (m, 2H), 6.68 (br s, 1H), 6.27 (s, 1H), 5.70 (s, 1H), 4.24 (q, J=7.1 Hz, 2H), 3.62 (q, J=6.3 Hz, 2H), 2.65 (t, J=6.5 Hz, 2H), 1.31 (t, J=7.1 Hz, 3H);

¹³C NMR (151 MHz, Chloroform-d) δ 167.5, 167.4, 138.1, 134.5, 131.4, 128.5, 127.3, 126.8, 61.1, 39.7, 31.8, 14.1; and HRMS (ESI) calcd for $C_{14}H_{18}NO_3^+$ (M+H)⁺ 248.1281, found 248.1281.

Embodiment 3

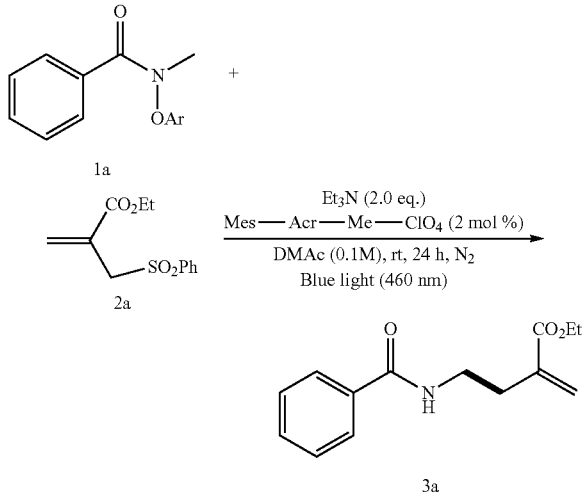

Mes-Acr-Me-ClO₄ (0.004 mmol, 2 mol %) and N-aryloxybenzoyl amine (1a, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a colorless oily product (3a, 28 mg, yield: 57%).

The data of hydrogen spectrum, carbon spectrum and high resolution mass spectrum of the product 3a prepared in Embodiment 3 are as follows.

¹H NMR (600 MHz, Chloroform-d) δ 7.78-7.76 (m, 2H), 7.50-7.48 (m, 1H), 7.44-7.42 (m, 2H), 6.68 (br s, 1H), 6.27 (s, 1H), 5.70 (s, 1H), 4.24 (q, J=7.1 Hz, 2H), 3.62 (q, J=6.3 Hz, 2H), 2.65 (t, J=6.5 Hz, 2H), 1.31 (t, J=7.1 Hz, 3H);

¹³C NMR (151 MHz, Chloroform-d) δ 167.5, 167.4, 138.1, 134.5, 131.4, 128.5, 127.3, 126.8, 61.1, 39.7, 31.8, 14.1; and HRMS (ESI) calcd for $C_{14}H_{18}NO_3^+$ (M+H)⁺ 248.1281, found 248.1281.

Embodiment 4

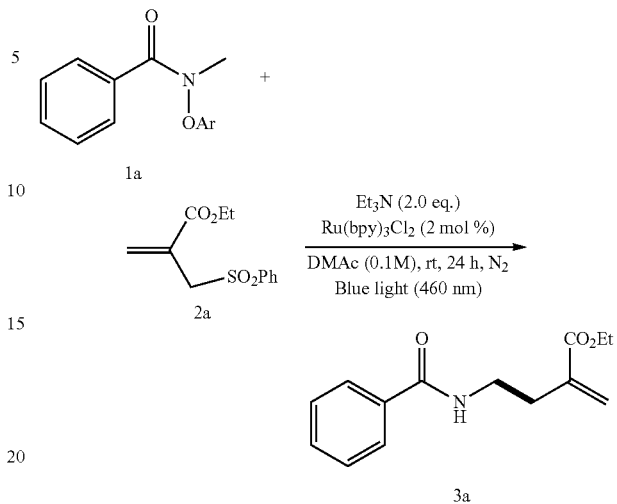

Ru(bpy)₃Cl₂ (0.004 mmol, 2 mol %) and N-aryloxybenzoyl amine (1a, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a colorless oily product (3a, 43 mg, yield: 87%).

The data of hydrogen spectrum, carbon spectrum and high resolution mass spectrum of the product 3a prepared in Embodiment 4 are as follows.

¹H NMR (600 MHz, Chloroform-d) δ 7.78-7.76 (m, 2H), 7.50-7.48 (m, 1H), 7.44-7.42 (m, 2H), 6.68 (br s, 1H), 6.27 (s, 1H), 5.70 (s, 1H), 4.24 (q, J=7.1 Hz, 2H), 3.62 (q, J=6.3 Hz, 2H), 2.65 (t, J=6.5 Hz, 2H), 1.31 (t, J=7.1 Hz, 3H);

¹³C NMR (151 MHz, Chloroform-d) δ 167.5, 167.4, 138.1, 134.5, 131.4, 128.5, 127.3, 126.8, 61.1, 39.7, 31.8, 14.1; and HRMS (ESI) calcd for $C_{14}H_{18}NO_3$+(M+H)⁺ 248.1281, found 248.1281.

Embodiment 5

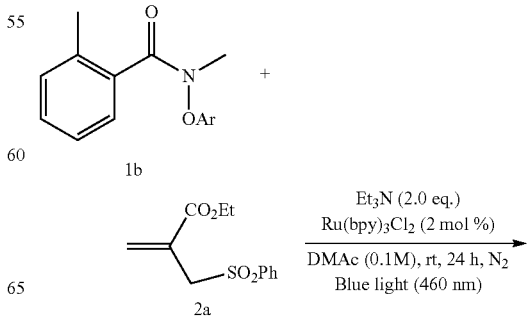

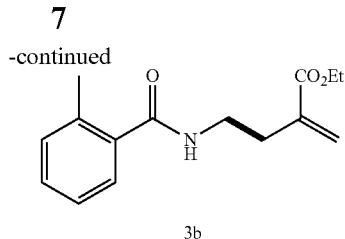

3b

Ru(bpy)₃Cl₂ (0.004 mmol, 2 mol %) and N-aryloxybenzoyl amine (1b, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a colorless oily product (3b, 37 mg, yield: 71%).

The data of hydrogen spectrum, carbon spectrum and high resolution mass spectrum of the product 3b prepared in Embodiment 5 are as follows.

¹H NMR (400 MHz, Chloroform-d) δ 7.32-7.27 (m, 2H), 7.21-7.16 (m, 2H), 6.27 (br s, 1H), 6.26 (doublet, coupling constant (d, J)=1.2 Hz, 1H), 6.03 (br s, 1H), 5.69 (d, J=1.3 Hz, 1H), 4.22 (q, J=7.1 Hz, 2H), 3.61 (q, J=6.4 Hz, 2H), 2.64 (t, J=6.6 Hz, 2H), 2.43 (s, 3H), 1.31 (t, J=7.1 Hz, 3H);

¹³C NMR (101 MHz, Chloroform-d) δ 170.1, 167.0, 137.8, 136.4, 136.0, 131.0, 129.8, 127.1, 126.6, 125.7, 61.0, 38.9, 32.0, 19.8, 14.1; and HRMS (ESI) calcd for C₁₅H₂₀NO₃+(M+H)⁺ 262.1438, found 262.1437.

Embodiment 6

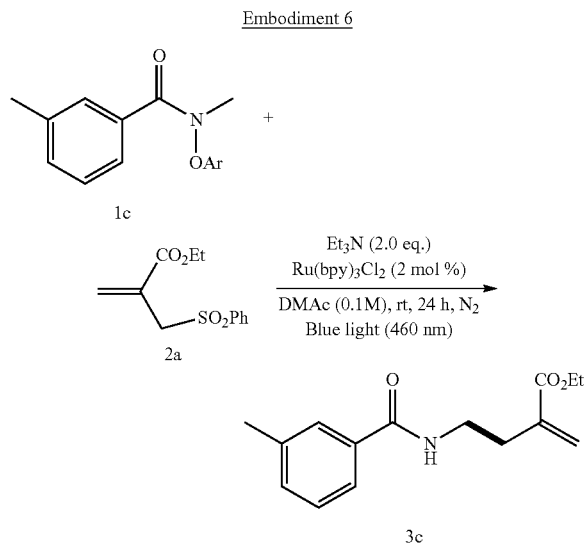

Ru(bpy)₃Cl₂ (0.004 mmol, 2 mol %) and N-aryloxybenzoyl amine (1c, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a colorless oily product (3c, 40 mg, yield: 76%).

The data of hydrogen spectrum, carbon spectrum and high resolution mass spectrum of the product 3c prepared in Embodiment 6 are as follows.

¹H NMR (400 MHz, Chloroform-d) δ 7.59 (s, 1H), 7.55-7.48 (m, 1H), 7.32-7.28 (m, 2H), 6.59 (br s, 1H), 6.25 (d, J=1.3 Hz, 1H), 5.68 (d, J=1.3 Hz, 1H), 4.23 (q, J=7.1 Hz, 2H), 3.60 (q, J=6.4 Hz, 2H), 2.63 (t, J=6.6 Hz, 2H), 2.38 (s, 3H), 1.30 (t, J=7.1 Hz, 3H);

¹³C NMR (101 MHz, Chloroform-d) δ 167.6, 167.4, 138.3, 138.1, 134.5, 132.1, 128.4, 127.6, 127.3, 123.7, 61.0, 39.5, 31.8, 21.3, 14.1; and HRMS (ESI) calcd for C₁₅H₂₀NO₃⁺ (M+H)⁺ 262.1438, found 262.1440.

Embodiment 7

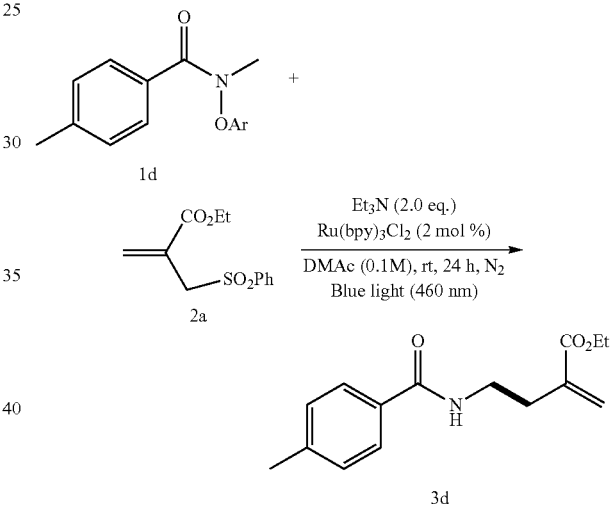

Ru(bpy)₃Cl₂ (0.004 mmol, 2 mol %) and N-aryloxybenzoyl amine (1d, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a colorless oily product (3d, 39 mg, yield: 75%).

The data of hydrogen spectrum, carbon spectrum and high resolution mass spectrum of the product 3d prepared in Embodiment 7 are as follows.

¹H NMR (400 MHz, Chloroform-d) δ 7.68-7.66 (m, 2H), 7.24-7.22 (m, 2H), 6.61 (br s, 1H), 6.26 (d, J 1.1 Hz, 1H), 5.69 (d, J=0.8 Hz, 1H), 4.23 (q, J=7.1 Hz, 2H), 3.60 (q, J=6.4 Hz, 2H), 2.64 (t, J=6.5 Hz, 2H), 2.39 (s, 3H), 1.31 (t, J=7.1 Hz, 3H);

$^{13}$C NMR (101 MHz, Chloroform-d) δ 167.5, 167.3, 141.8, 138.1, 131.6, 129.2, 127.3, 126.8, 61.1, 39.6, 31.8, 21.4, 14.1; and HRMS (ESI) calcd for $C_{15}H_{19}NO_3Na^+$ (M+Na)$^+$ 284.1257, found 284.1254.

Embodiment 8

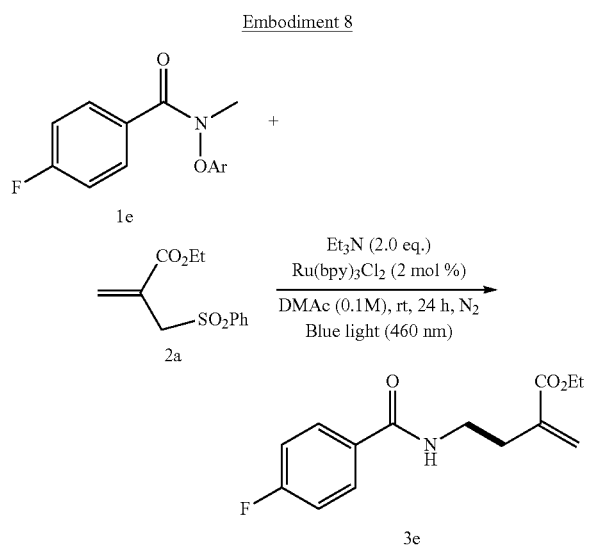

Ru(bpy)$_3$Cl$_2$ (0.004 mmol, 2 mol %) and N-aryloxybenzoyl amine (1e, 0.4 mmol) are added into the dried Schlenk tube, and then 2-((phenylsulfonyl) methyl)acrylate (2a, 0.2 mmol), Et$_3$N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na$_2$SO$_4$, filtered and concentrated, and further separated and purified by column chromatography (the eluent is petroleum ether:ethyl acetate=20:1 volume per volume (v/v)), to obtain a colorless oily product (3e, 43 mg, yield: 81%).

The data of hydrogen spectrum, carbon spectrum and high resolution mass spectrum of the product 3e prepared in Embodiment 8 are as follows.

$^1$H NMR (600 MHz, Chloroform-d) δ 7.79-7.77 (m, 2H), 7.11-7.08 (m, 2H), 6.70 (br s, 1H), 6.26 (s, 1H), 5.70 (s, 1H), 4.23 (q, J=7.1 Hz, 2H), 3.59 (q, J=5.9 Hz, 2H), 2.63 (t, J=6.5 Hz, 2H), 1.31 (t, J=7.1 Hz, 3H);

$^{13}$C NMR (101 MHz, Chloroform-d) δ 167.7, 166.3, 164.7 (d, J=251.7 Hz), 138.2, 130.6 (d, J=3.5 Hz), 129.1 (d, J=8.8 Hz), 127.5, 115.5 (d, J=21.8 Hz), 61.2, 40.0, 31.7, 14.1; and $^{19}$F NMR (377 MHz, Chloroform-d) δ −113.30; and HRMS (ESI) calcd for $C_{14}H_{17}FNO_3^+$ (M+H)$^+$ 266.1187, found 266.1190.

Embodiment 9

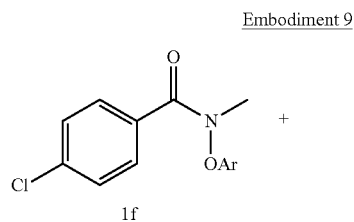

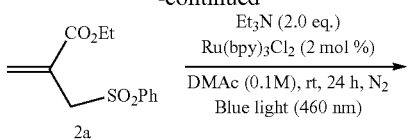

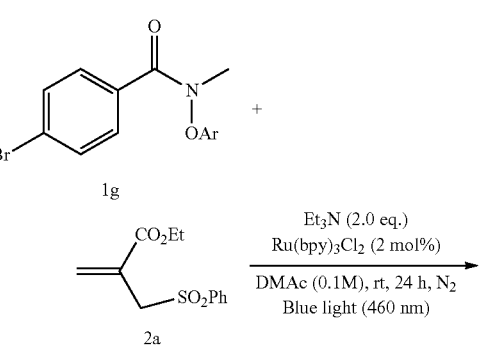

Ru(bpy)$_3$Cl$_2$ (0.004 mmol, 2 mol %) and N-aryloxybenzoyl amine (1f, 0.4 mmol) are added into the dried Schlenk tube, and then 2-((phenylsulfonyl) methyl)acrylate (2a, 0.2 mmol), Et$_3$N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na$_2$SO$_4$, filtered and concentrated, and further separated and purified by column chromatography (the eluent is petroleum ether:ethyl acetate=20:1 volume per volume (v/v)), to obtain a colorless oily product (3f, 46 mg, yield: 82%).

The data of hydrogen spectrum, carbon spectrum and high resolution mass spectrum of the product 3f prepared in Embodiment 9 are as follows.

$^1$H NMR (400 MHz, Chloroform-d) δ 7.71 (d, J=8.4 Hz, 2H), 7.39 (d, J=8.5 Hz, 2H), 6.78 (br s, 1H), 6.25 (s, 1H), 5.69 (s, 1H), 4.23 (q, J=7.1 Hz, 2H), 3.58 (q, J=6.1 Hz, 2H), 2.63 (t, J=6.4 Hz, 2H), 1.30 (t, J=7.1 Hz, 3H);

$^{13}$C NMR (101 MHz, Chloroform-d) δ 167.7, 166.3, 138.2, 137.6, 132.8, 128.7, 128.3, 127.5, 61.2, 40.0, 31.7, 14.1; and HRMS (ESI) calcd for $C_{14}H_{17}ClNO_3^+$ (M+H)$^+$ 282.0891, found 282.0890.

Embodiment 10

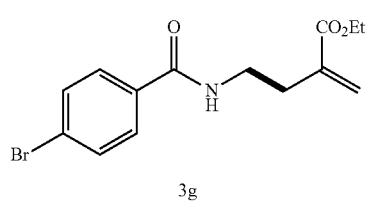

Ru(bpy)₃Cl₂ (0.004 mmol, 2 mol %) and N-aryloxybenzoyl amine (1 g, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a colorless oily product (3 g, 52 mg, yield: 80%).

The data of hydrogen spectrum, carbon spectrum and high resolution mass spectrum of the product 3g prepared in Embodiment 10 are as follows.

¹H NMR (400 MHz, Chloroform-d) δ 7.64 (d, J=8.6 Hz, 2H), 7.54 (s, 2H), 6.77 (br s, 1H), 6.25 (d, J=1.0 Hz, 1H), 5.69 (d, J=0.92 Hz, 1H), 4.23 (q, J=7.1 Hz, 2H), 3.58 (q, J=6.2 Hz, 2H), 2.63 (t, J=6.4 Hz, 2H), 1.31 (t, J=7.1 Hz, 3H);

¹³C NMR (101 MHz, Chloroform-d) δ 167.7, 166.3, 138.2, 133.3, 131.7, 128.5, 127.5, 126.0, 61.2, 40.0, 31.7, 14.1; and HRMS (ESI) calcd for $C_{14}H_{17}BrNO_3^+$ (M+H)⁺ 326.0386, found 326.0384.

Embodiment 11

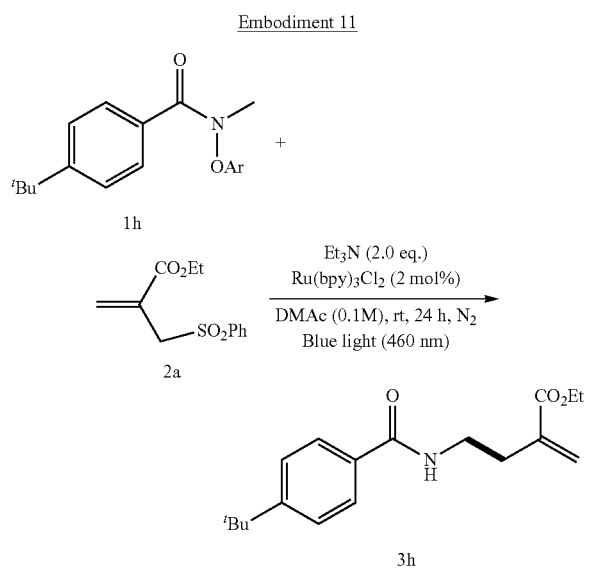

Ru(bpy)₃Cl₂ (0.004 mmol, 2 mol %) and N-aryloxybenzoyl amine (1h, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a colorless oily product (3h, 47 mg, yield: 77%).

The data of hydrogen spectrum, carbon spectrum and high resolution mass spectrum of the product 3h prepared in Embodiment 11 are as follows.

¹H NMR (400 MHz, Chloroform-d) δ 7.70 (d, J=8.3 Hz, 2H), 7.43 (d, J=8.4 Hz, 2H), 6.61 (br s, 1H), 6.25 (s, 1H), 5.68 (s, 1H), 4.23 (q, J=7.1 Hz, 2H), 3.60 (q, J=6.2 Hz, 2H), 2.63 (t, J=6.5 Hz, 2H), 1.32 (s, 9H), 1.29 (d, J=7.1 Hz, 3H);

¹³C NMR (101 MHz, Chloroform-d) δ 167.5, 167.3, 154.8, 138.1, 131.6, 127.2, 126.6, 125.4, 61.0, 39.5, 34.9, 31.8, 31.1, 14.1; and HRMS (ESI) calcd for $C_{18}H_{26}NO_3^+$ (M+H)⁺ 304.1907, found 304.1907.

Embodiment 12

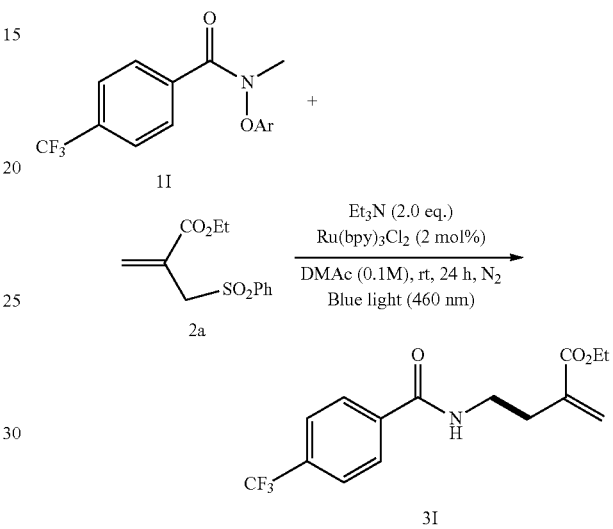

Ru(bpy)₃Cl₂ (0.004 mmol, 2 mol %) and N-aryloxybenzoyl amine (1l, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a white solid product (3i, 52 mg, yield: 83%, melting point: 69-70 degrees Celsius (° C.)).

The data of hydrogen spectrum, carbon spectrum and high resolution mass spectrum of the product 3i prepared in Embodiment 12 are as follows.

¹H NMR (400 MHz, Chloroform-d) δ 7.90 (d, J=8.1 Hz, 2H), 7.69 (d, J=8.2 Hz, 2H), 6.97 (br s, 1H), 6.28 (d, J=0.8 Hz, 1H), 5.73 (s, 1H), 4.24 (q, J=7.1 Hz, 2H), 3.62 (q, J=5.8 Hz, 2H), 2.65 (t, J=6.4 Hz, 2H), 1.32 (t, J=7.1 Hz, 3H);

¹³C NMR (101 MHz, Chloroform-d) δ 167.8, 166.0, 138.1, 137.7, 133.0 (q, J=33.0 Hz), 127.7, 127.3, 125.6 (q, J=3.7 Hz), 123.7 (q, J=272.5 Hz), 70.1, 61.2, 40.2, 31.6, 14.1; and ¹⁹F NMR (377 MHz, Chloroform-d) δ −62.9; and HRMS (ESI) calcd for $C_{15}H_{17}F_3NO_3^+$ (M+H)⁺ 316.1155, found 316.1154.

Embodiment 13

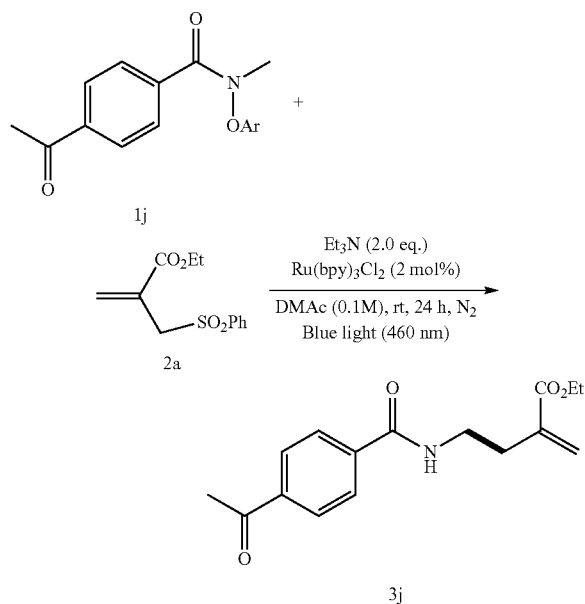

Ru(bpy)$_3$Cl$_2$ (0.004 mmol, 2 mol %) and N-aryloxybenzoyl amine (1j, 0.4 mmol) are added into the dried Schlenk tube, and then 2-((phenylsulfonyl) methyl)acrylate (2a, 0.2 mmol), Et$_3$N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na$_2$SO$_4$, filtered and concentrated, and further separated and purified by column chromatography (the eluent is petroleum ether:ethyl acetate=20:1 volume per volume (v/v)), to obtain a colorless oily product (3j, 46 mg, yield: 80%).

The data of hydrogen spectrum, carbon spectrum and high resolution mass spectrum of the product 3j prepared in Embodiment 13 are as follows.

$^1$H NMR (400 MHz, Chloroform-d) δ 7.96 (d, J=8.1 Hz, 2H), 7.84 (d, J=8.2 Hz, 2H), 6.99 (br s, 1H), 6.24 (s, 1H), 5.69 (s, 1H), 4.21 (q, J=7.1 Hz, 2H), 3.59 (q, J=6.1 Hz, 2H), 2.63 (t, J=6.7 Hz, 2H), 2.60 (s, 3H), 1.29 (t, J=7.1 Hz, 3H);

$^{13}$C NMR (101 MHz, Chloroform-d) δ 197.5, 167.6, 166.3, 139.0, 138.3, 138.1, 128.4, 127.4, 127.2, 61.1, 40.0, 31.6, 26.7, 14.1; and HRMS (ESI) calcd for C$_{16}$H$_{20}$NO$_4^+$ (M+H)$^+$ 290.1387, found 290.1387.

Embodiment 14

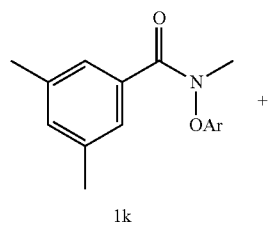

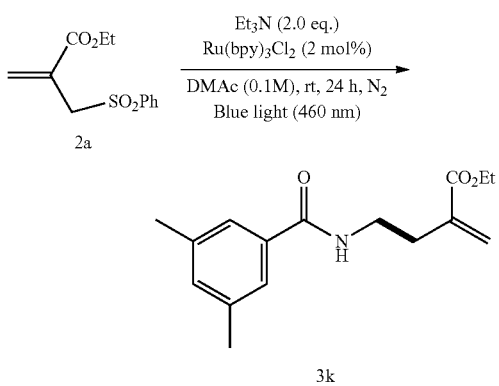

Ru(bpy)$_3$Cl$_2$ (0.004 mmol, 2 mol %) and N-aryloxybenzoyl amine (1k, 0.4 mmol) are added into the dried Schlenk tube, and then 2-((phenylsulfonyl) methyl)acrylate (2a, 0.2 mmol), Et$_3$N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na$_2$SO$_4$, filtered and concentrated, and further separated and purified by column chromatography (the eluent is petroleum ether:ethyl acetate=20:1 volume per volume (v/v)), to obtain a colorless oily product (3k, 47 mg, yield: 85%).

The data of hydrogen spectrum, carbon spectrum and high resolution mass spectrum of the product 3k prepared in Embodiment 14 are as follows.

$^1$H NMR (400 MHz, Chloroform-d) δ 7.35 (s, 2H), 7.11 (s, 1H), 6.51 (br s, 1H), 6.28-6.23 (m, 1H), 5.68 (s, 1H), 4.23 (q, J=7.1 Hz, 2H), 3.59 (q, J=6.4 Hz, 2H), 2.63 (t, J=6.5 Hz, 2H), 2.34 (s, 6H), 1.31 (t, J=7.1 Hz, 3H);

$^{13}$C NMR (101 MHz, Chloroform-d) δ 168.1, 167.7, 138.5, 138.4, 134.8, 133.2, 127.5, 124.9, 61.3, 39.8, 32.1, 21.5, 14.5; and HRMS (ESI) calcd for C$_{16}$H$_{22}$NO$_3^+$ (M+H)$^+$ 276.1594, found 276.1595.

Embodiment 15

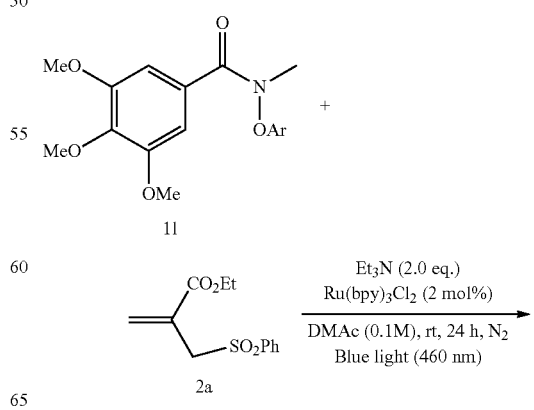

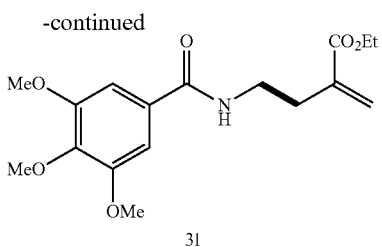

31

Ru(bpy)$_3$Cl$_2$ (0.004 mmol, 2 mol %) and N-aryloxybenzoyl amine (1l, 0.4 mmol) are added into the dried Schlenk tube, and then 2-((phenylsulfonyl) methyl)acrylate (2a, 0.2 mmol), Et$_3$N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na$_2$SO$_4$, filtered and concentrated, and further separated and purified by column chromatography (the eluent is petroleum ether:ethyl acetate=20:1 volume per volume (v/v)), to obtain a colorless oily product (3l, 51 mg, yield: 75%).

The data of hydrogen spectrum, carbon spectrum and high resolution mass spectrum of the product 3l prepared in Embodiment 15 are as follows.

$^1$H NMR (600 MHz, Chloroform-d) δ 7.03 (s, 2H), 6.87 (s, 1H), 6.25 (s, 1H), 5.71 (s, 1H), 4.21 (q, J=7.1 Hz, 2H), 3.89 (s, 6H), 3.86 (s, 3H), 3.57 (q, J=6.1 Hz, 2H), 2.62 (t, J=6.4 Hz, 2H), 1.30 (t, J=7.1 Hz, 3H);

$^{13}$C NMR (151 MHz, Chloroform-d) δ 167.7, 166.7, 152.9, 140.5, 138.1, 129.6, 127.3, 104.0, 60.9, 60.6, 56.0, 40.0, 31.5, 13.9; and HRMS (ESI) calcd for C$_{17}$H$_{24}$NO$_6{}^+$ (M+H)$^+$ 338.1598, found 338.1595.

Embodiment 16

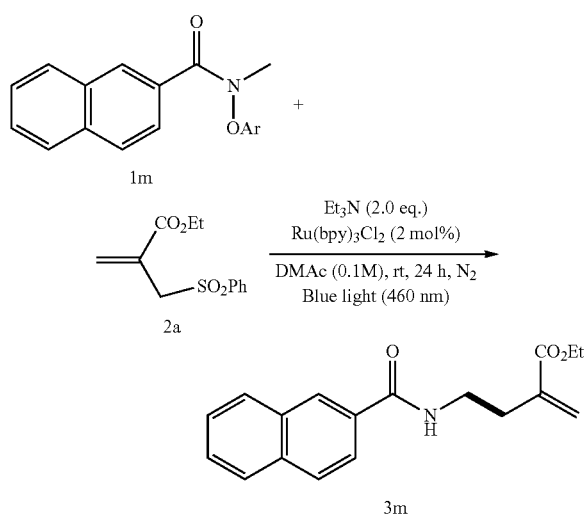

Ru(bpy)$_3$Cl$_2$ (0.004 mmol, 2 mol %) and N-aryloxybenzoyl amine (1m, 0.4 mmol) are added into the dried Schlenk tube, and then 2-((phenylsulfonyl) methyl)acrylate (2a, 0.2 mmol), Et$_3$N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na$_2$SO$_4$, filtered and concentrated, and further separated and purified by column chromatography (the eluent is petroleum ether:ethyl acetate=20:1 volume per volume (v/v)), to obtain a colorless oily product (3m, 46 mg, yield: 78%).

The data of hydrogen spectrum, carbon spectrum and high resolution mass spectrum of the product 3m prepared in Embodiment 16 are as follows.

$^1$H NMR (600 MHz, Chloroform-d) δ 8.30 (s, 1H), 7.92 (d, J=7.8 Hz, 1H), 7.90-7.86 (m, 2H), 7.83 (doublet of doublets, coupling constant (dd, J)=8.5, 1.7 Hz, 1H), 7.59-7.51 (m, 2H), 6.81 (br s, 1H), 6.29 (d, J=1.3 Hz, 1H), 5.72 (d, J=0.9 Hz, 1H), 4.25 (q, J=7.1 Hz, 2H), 3.68 (q, J=6.3 Hz, 2H), 2.69 (t, J=6.5 Hz, 2H), 1.32 (t, J=7.1 Hz, 3H);

$^{13}$C NMR (151 MHz, Chloroform-d) δ 167.4, 167.2, 138.0, 134.5, 132.4, 131.5, 128.7, 128.2, 127.5, 127.3, 127.2, 127.1, 126.5, 123.3, 60.9, 39.6, 31.6, 14.0; and HRMS (ESI) calcd for C$_{18}$H$_{20}$NO$_3{}^+$ (M+H)$^+$ 298.1438, found 298.1436.

Embodiment 17

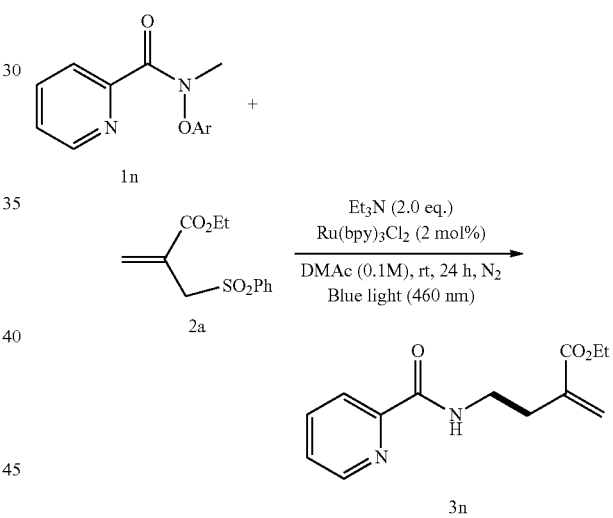

Ru(bpy)$_3$Cl$_2$ (0.004 mmol, 2 mol %) and N-aryloxybenzoyl amine (1n, 0.4 mmol) are added into the dried Schlenk tube, and then 2-((phenylsulfonyl) methyl)acrylate (2a, 0.2 mmol), Et$_3$N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na$_2$SO$_4$, filtered and concentrated, and further separated and purified by column chromatography (the eluent is petroleum ether:ethyl acetate=20:1 volume per volume (v/v)), to obtain a colorless oily product (3n, 39 mg, yield: 79%).

The data of hydrogen spectrum, carbon spectrum and high resolution mass spectrum of the product 3n prepared in Embodiment 17 are as follows.

$^1$H NMR (600 MHz, Chloroform-d) δ 8.54 (d, J=4.6 Hz, 1H), 8.19 (d, J=7.8 Hz, 1H), 8.17 (br s, 1H), 7.87-7.81 (m, 1H), 7.45-7.40 (m, 1H), 6.27 (d, J=1.2 Hz, 1H), 5.66 (d, J=1.3 Hz, 1H), 4.23 (q, J=7.1 Hz, 2H), 3.65 (q, J=6.7 Hz, 2H), 2.66 (t, J=6.8 Hz, 2H), 1.32 (t, J=7.1 Hz, 3H);
$^{13}$C NMR (151 MHz, Chloroform-d) δ 167.0, 164.5, 150.1, 148.2, 137.9, 137.5, 127.1, 126.3, 122.4, 61.1, 38.5, 32.3, 14.4; and
HRMS (ESI) calcd for $C_{13}H_{17}N_2O_3^+$ (M+H)$^+$ 249.1234, found 249.1238.

Embodiment 18

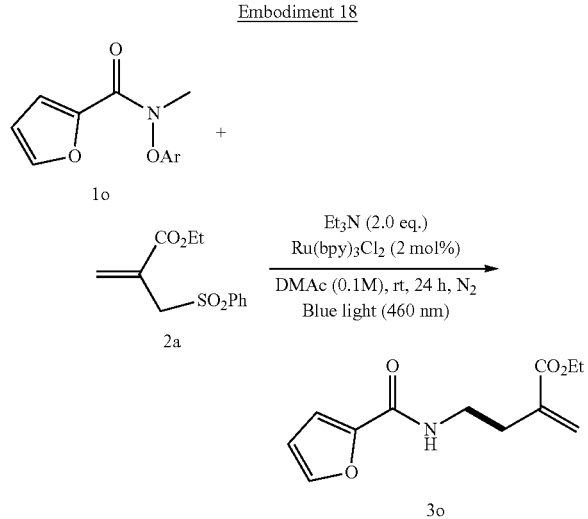

Ru(bpy)$_3$Cl$_2$ (0.004 mmol, 2 mol %) and N-aryloxybenzoyl amine (1o, 0.4 mmol) are added into the dried Schlenk tube, and then 2-((phenylsulfonyl) methyl)acrylate (2a, 0.2 mmol), Et$_3$N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na$_2$SO$_4$, filtered and concentrated, and further separated and purified by column chromatography (the eluent is petroleum ether:ethyl acetate=20:1 volume per volume (v/v)), to obtain a colorless oily product (3o, 35 mg, yield: 74%).

The data of hydrogen spectrum, carbon spectrum and high resolution mass spectrum of the product 3o prepared in Embodiment 18 are as follows.

$^1$H NMR (600 MHz, Chloroform-d) δ 7.45 (s, 1H), 7.12 (d, J=3.3 Hz, 1H), 6.62 (br s, 1H), 6.51 (dd, J=3.4, 1.7 Hz, 1H), 6.29 (s, 1H), 5.69 (s, 1H), 4.25 (q, J=7.1 Hz, 2H), 3.61 (q, J=6.5 Hz, 2H), 2.64 (t, J=6.7 Hz, 2H), 1.34 (t, J=7.1 Hz, 3H);
$^{13}$C NMR (151 MHz, Chloroform-d) δ 167.2, 158.5, 148.1, 143.9, 137.9, 127.3, 114.1, 112.2, 61.1, 38.5, 32.1, 14.3; and
HRMS (ESI) calcd for $C_{12}H_{16}NO_4^+$ (M+H)$^+$ 238.1074, found 238.1075.

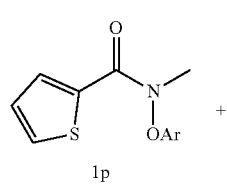

1p

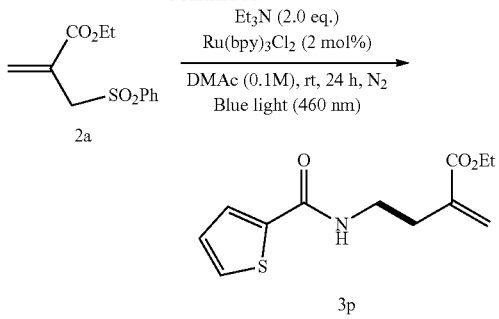

Ru(bpy)$_3$Cl$_2$ (0.004 mmol, 2 mol %) and N-aryloxybenzoyl amine (1p, 0.4 mmol) are added into the dried Schlenk tube, and then 2-((phenylsulfonyl) methyl)acrylate (2a, 0.2 mmol), Et$_3$N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na$_2$SO$_4$, filtered and concentrated, and further separated and purified by column chromatography (the eluent is petroleum ether:ethyl acetate=20:1 volume per volume (v/v)), to obtain a colorless oily product (3p, 40 mg, yield: 80%).

The data of hydrogen spectrum, carbon spectrum and high resolution mass spectrum of the product 3p prepared in Embodiment 19 are as follows.

$^1$H NMR (400 MHz, Chloroform-d) δ 7.50-7.43 (m, 2H), 7.07 (dd, J=5.0, 3.7 Hz, 1H), 6.61 (br s, 1H), 6.26 (d, J=1.2 Hz, 1H), 5.70 (d, J=1.1 Hz, 1H), 4.24 (q, J=7.1 Hz, 2H), 3.58 (q, J=6.4 Hz, 2H), 2.63 (t, J=6.4 Hz, 2H), 1.32 (t, J=7.1 Hz, 3H);
$^{13}$C NMR (101 MHz, Chloroform-d) δ 167.6, 161.8, 139.1, 138.0, 129.7, 127.8, 127.5, 127.5, 61.1, 39.7, 31.8, 14.1; and
HRMS (ESI) calcd for $C_{12}H_{16}NO_3S^+$ (M+H)$^+$ 254.0846, found 254.0849.

Embodiment 20

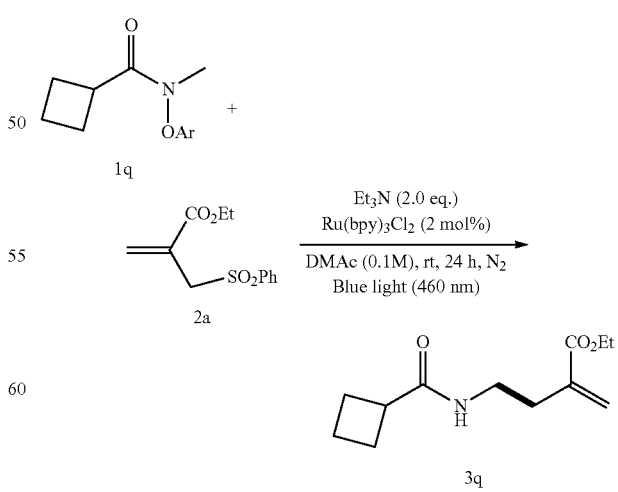

Ru(bpy)$_3$Cl$_2$ (0.004 mmol, 2 mol %) and N-aryloxybenzoyl amine (1q, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a colorless oily product (3q, 32 mg, yield: 70%).

The data of hydrogen spectrum, carbon spectrum and high resolution mass spectrum of the product 3q prepared in Embodiment 20 are as follows.

¹H NMR (400 MHz, Chloroform-d) δ 6.24 (d, J=1.1 Hz, 1H), 5.71 (br s, 1H), 5.62 (d, J=1.04 Hz, 1H), 4.23 (q, J=7.1 Hz, 2H), 3.41 (q, J=6.5 Hz, 2H), 3.03-2.93 (m, 1H), 2.53 (t, J=6.5 Hz, 2H), 2.31-2.21 (m, 2H), 2.19-2.08 (m, 2H), 2.02-1.91 (m, 1H), 1.91-1.84 (m, 1H), 1.33 (t, J=7.1 Hz, 3H);

¹³C NMR (101 MHz, Chloroform-d) δ 175.0, 167.2, 137.9, 127.0, 61.0, 39.9, 38.6, 31.9, 25.3, 18.1, 14.2; and HRMS (ESI) calcd for C₁₂H₂₀NO₃⁺ (M+H)⁺ 226.1438, found 226.1438.

Embodiment 21

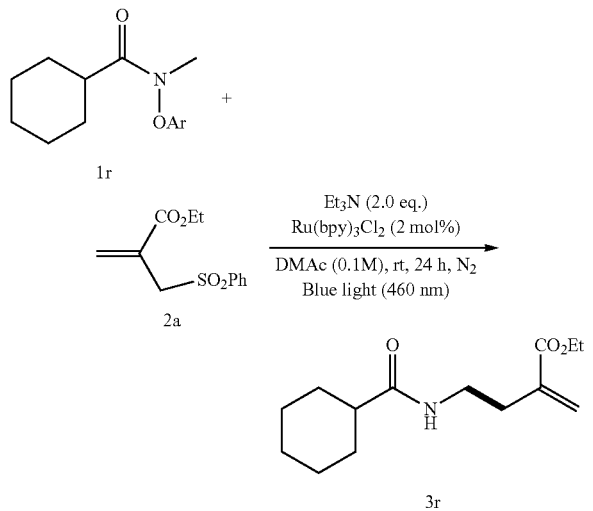

Ru(bpy)₃Cl₂ (0.004 mmol, 2 mol %) and N-aryloxybenzoyl amine (1r, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a colorless oily product (3r, 35 mg, yield: 69%).

The data of hydrogen spectrum, carbon spectrum and high resolution mass spectrum of the product 3r prepared in Embodiment 21 are as follows.

¹H NMR (400 MHz, Chloroform-d) δ 6.22 (s, 1H), 5.75 (br s, 1H), 5.61 (s, 1H), 4.22 (q, J=7.1 Hz, 2H), 3.39 (q, J=6.4 Hz, 2H), 2.51 (t, J=6.6 Hz, 2H), 2.03 (triplet of triplets, coupling constant (tt, J) 11.8, 3.3 Hz, 1H), 1.84-1.75 (m, 4H), 1.39 (q, J=11.6 Hz, 2H), 1.31 (t, J=7.1 Hz, 3H), 1.24 (q, J=10.8, 8.6 Hz, 4H);

¹³C NMR (101 MHz, Chloroform-d) δ 176.1, 167.2, 137.9, 127.0, 60.9, 45.5, 38.5, 31.9, 29.7, 25.7, 14.2; and HRMS (ESI) calcd for C₁₄H₂₄NO₃⁺ (M+H)⁺ 254.1751, found 254.1751.

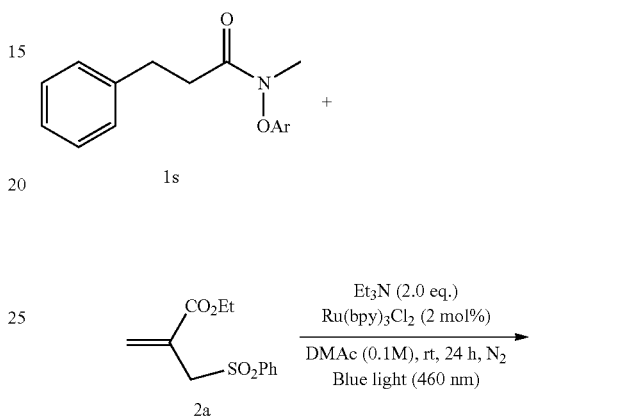

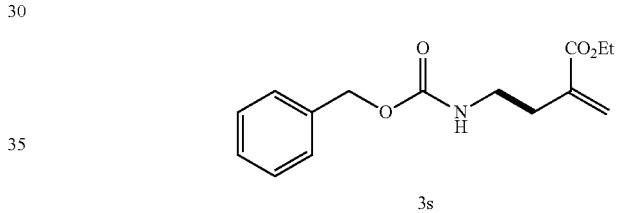

Ru(bpy)₃Cl₂ (0.004 mmol, 2 mol %) and N-aryloxybenzoyl amine (1s, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a colorless oily product (3s, 41 mg, yield: 74%).

The data of hydrogen spectrum, carbon spectrum and high resolution mass spectrum of the product 3s prepared in Embodiment 22 are as follows.

¹H NMR (400 MHz, Chloroform-d) δ 7.37 (s, 5H), 6.24 (s, 1H), 5.62 (s, 1H), 5.11 (s, 2H), 4.92 (br s, 1H), 4.25-4.13 (m, 2H), 3.39 (q, J=6.4 Hz, 2H), 2.55 (t, J=6.6 Hz, 2H), 1.32 (t, J=6.9 Hz, 3H);

¹³C NMR (101 MHz, Chloroform-d) δ 167.2, 156.6, 137.9, 136.9, 128.8, 128.4, 127.3, 66.9, 61.2, 40.3, 32.7, 14.5; and HRMS (ESI) calcd for C₁₅H₂₀NO₄⁺ (M+H)⁺ 278.1387, found 278.1387.

Embodiment 23

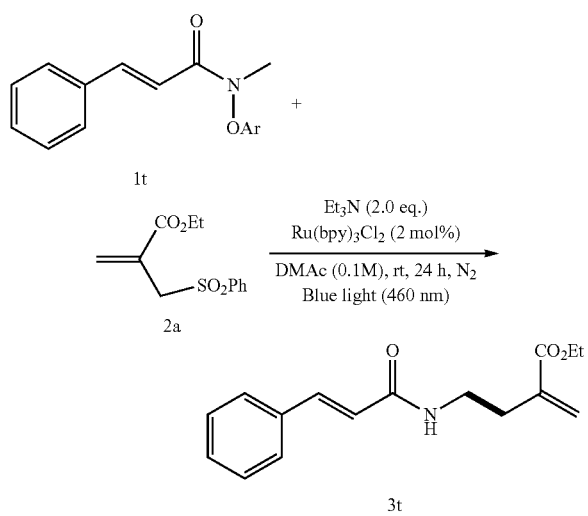

Ru(bpy)₃Cl₂ (0.004 mmol, 2 mol %) and N-aryloxybenzoyl amine (1t, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a colorless oily product (3t, 33 mg, yield: 61%).

The data of hydrogen spectrum, carbon spectrum and high resolution mass spectrum of the product 3t prepared in Embodiment 23 are as follows.

¹H NMR (600 MHz, Chloroform-d) δ 7.61 (d, J=15.6 Hz, 1H), 7.52-7.48 (m, 2H), 7.36 (q, J=6.2 Hz, 3H), 6.37 (d, J=15.6 Hz, 1H), 6.26 (d, J=1.0 Hz, 1H), 5.99 (br s, 1H), 5.70-5.67 (m, 1H), 4.24 (q, J=7.1 Hz, 2H), 3.55 (q, J=6.5 Hz, 2H), 2.60 (t, J=6.5 Hz, 2H), 1.33 (t, J=7.1 Hz, 3H);

¹³C NMR (101 MHz, Chloroform-d) δ 167.3, 165.9, 140.9, 137.9, 134.8, 129.6, 128.8, 127.7, 127.2, 120.6, 61.0, 39.1, 31.9, 14.1; and HRMS (ESI) calcd for C₁₆H₂₀NO₃⁺ (M+H)⁺ 274.1438, found 274.1439.

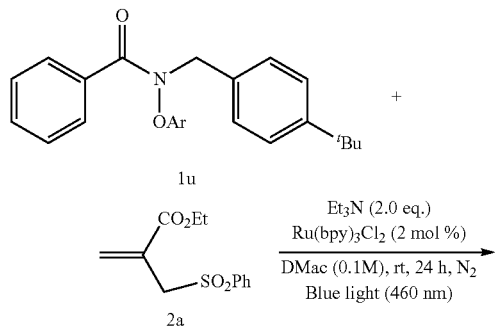

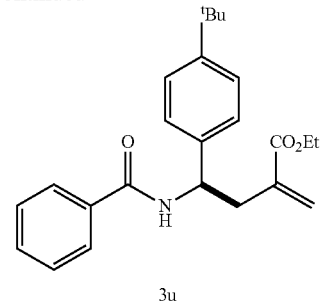

Ru(bpy)₃Cl₂ (0.004 mmol, 2 mol %) and N-aryloxybenzoyl amine (1u, 0.4 mmol) are added into the dried Schlenk tube, and then 2-((phenylsulfonyl) methyl)acrylate (2a, 0.2 mmol), Et₃N (0.4 mmol), and acetonitrile (2.0 mL, 0.1 M) are added under nitrogen atmosphere. The reaction system is placed under 460 nm blue light and stirred at room temperature for 24 hours. After the reaction, water is added for quenching, and ethyl acetate is extracted for three times. The combined organic layers are washed once with NaOH solution (1 mol/L), once with saturated salt solution, dried with Na₂SO₄, filtered and concentrated, and further separated and purified by column chromatography (the eluent is petroleum ether:ethyl acetate=20:1 volume per volume (v/v)), to obtain a colorless oily product (3u, 45 mg, yield: 60%).

The data of hydrogen spectrum, carbon spectrum and high resolution mass spectrum of the product 3u prepared in Embodiment 24 are as follows.

¹H NMR (400 MHz, Chloroform-d) δ 7.86-7.79 (m, 2H), 7.52-7.46 (m, 1H), 7.45-7.38 (m, 2H), 7.35 (d, J=8.5 Hz, 2H), 7.29 (d, J=8.4 Hz, 2H), 7.21 (d, J=7.2 Hz, 1H), 6.27 (s, 1H), 5.72 (s, 1H), 5.28-5.22 (m, 1H), 4.22 (q, J=7.1 Hz, 2H), 3.00-2.79 (m, 2H), 1.32 (s, 9H), 1.28 (d, J=7.1 Hz, 3H);

¹³C NMR (101 MHz, Chloroform-d) δ 168.5, 166.6, 150.3, 139.1, 137.4, 134.4, 131.5, 128.6, 128.5, 127.1, 126.1, 125.7, 61.4, 54.7, 38.6, 34.6, 31.5, 14.3; and HRMS (ESI) calcd for C₂₄H₃₀NO₃⁺ (M+H)⁺ 380.2220, found 380.2220.

The above are only preferred embodiments of this disclosure, but the protection scope of this disclosure is not limited to this. Any change or replacement that may be easily thought of by a person familiar with this technical field within the technical scope disclosed in this disclosure should be covered by this disclosure. Therefore, the protection scope of this disclosure should be based on the protection scope of the claims.

What is claimed is:

1. A preparation method of N-butenyl amide compounds, wherein N-aryloxy amide and benzenesulfonyl substituted olefins are added into an alkaline organic solvent, a free radical initiator is added, and the N-butenyl amide compounds are prepared through a free radical amidation reaction of olefins under illumination;

wherein the free radical amidation reaction of the olefins is:

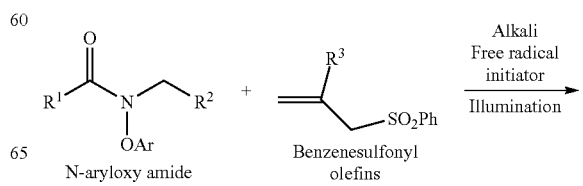

-continued

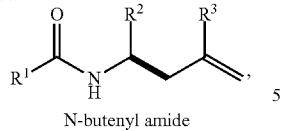
N-butenyl amide wherein $R^1$ is selected from an alkyl group, substituted alkyl group, alkenyl group, ester group, aryl group, substituted aryl group, or heteroaromatic ring, $R^2$ is hydrogen or aryl group, and $R^3$ is $CO_2Et$, and Ar is 4-nitrophenyl;

the organic solvent is N, N-dimethylacetamide;

the alkali is triethylamine; and a wavelength of the illumination is 460 nm.

2. The preparation method according to claim 1, wherein the free radical initiator is one or more of $Pd(PPh_3)_2Cl_2$, $Ni(PPh_3)_2Cl_2$, CuCl, Cu(TC), $Cu(MeCN)_4PF_6$, $FeCl_3$, Eosin Y, 4CzIPN, TPT, Rhodamine B, fac-Ir(ppy)$_3$, Ir(ppy)$_2$bpyPF$_6$, Ir[ppy]$_2$(dtbbpy)PF$_6$, Ir[dF(CF$_3$)ppy]$_2$(dtbbpy)PF$_6$, Mes-Acr-Me-ClO$_4$, Mes-(t-Bu)$_2$Acr-Ph-BF$_4$, Mes-Acr-I, Mes-Acr-Me-PF$_6$, Mes-Acr-Ph-Cl, Mes-Acr-Ph-BF$_4$, Ru(bpz)$_3$(PF$_6$)$_2$, Ru(bpy)$_3$Cl$_2$, Ru(PPh$_3$)$_2$Cl$_2$, and Ru(PPh$_3$)$_3$ Cl$_2$.

3. The preparation method according to claim 1, wherein a molar ratio of the N-aryloxy amide to benzenesulfonyl olefins is 1.2-3.0:1.

4. The preparation method according to claim 1, wherein the free radical amidation reaction is carried out at room temperature, and a reaction duration is 2-48 hours.

* * * * *